United States Patent [19]

Epperly et al.

[11] Patent Number: 4,877,590

[45] Date of Patent: * Oct. 31, 1989

[54] PROCESS FOR NITROGEN OXIDES REDUCTION WITH MINIMIZATION OF THE PRODUCTION OF OTHER POLLUTANTS

[75] Inventors: William R. Epperly, New Canaan; John H. O'Leary, Danbury; James C. Sullivan, Westport; Barry N. Sprague, West Haven, all of Conn.

[73] Assignee: Fuel Tech, Inc., Stamford, Conn.

[*] Notice: The portion of the term of this patent subsequent to Oct. 25, 2005 has been disclaimed.

[21] Appl. No.: 155,864

[22] Filed: Feb. 29, 1988

Related U.S. Application Data

[63] Continuation-in-part of Ser. No. 22,799, Mar. 6, 1987, abandoned, and a continuation-in-part of Ser. No. 50,198, May 14, 1987, Pat. No. 4,780,289, and a continuation-in-part of Ser. No. 108,779, Oct. 14, 1987, abandoned, and a continuation-in-part of Ser. No. 90,962, Aug. 28, 1987, Pat. No. 4,777,024.

[51] Int. Cl.$^4$ .............................................. C01B 21/00
[52] U.S. Cl. .................................... 423/235; 423/239
[58] Field of Search .................. 423/235, 239, 239 A; 422/62

[56] References Cited

U.S. PATENT DOCUMENTS

| | | | |
|---|---|---|---|
| 4,208,386 | 6/1980 | Arand et al. | 423/235 |
| 4,314,345 | 2/1982 | Shiraishi et al. | 423/235 |
| 4,473,536 | 9/1984 | Carberg et al. | 423/239 |
| 4,473,537 | 9/1984 | Ford et al. | 423/239 |
| 4,565,679 | 1/1986 | Michalati et al. | 423/239 |

*Primary Examiner*—Gregory A. Heller
*Attorney, Agent, or Firm*—St. Onge Steward Johnston & Reens

[57] ABSTRACT

A process for the reduction of nitrogen oxides in an effluent from the combustion of a carbonaceous fuel while minimizing the production of other pollutants is presented. The process comprises introducing a nitrogen oxides reducing treatment agent comprising a hydrocarbon into an effluent at a temperature below about 1450° F. according to a nitrogen oxides reducing treatment regimen under conditions such that the hydrocarbon treatment agent is operating on the high temperature or right side of its nitrogen oxides reduction versus effluent temperature curve, especially on the high temperature or right side of the curve plateau.

41 Claims, 1 Drawing Sheet

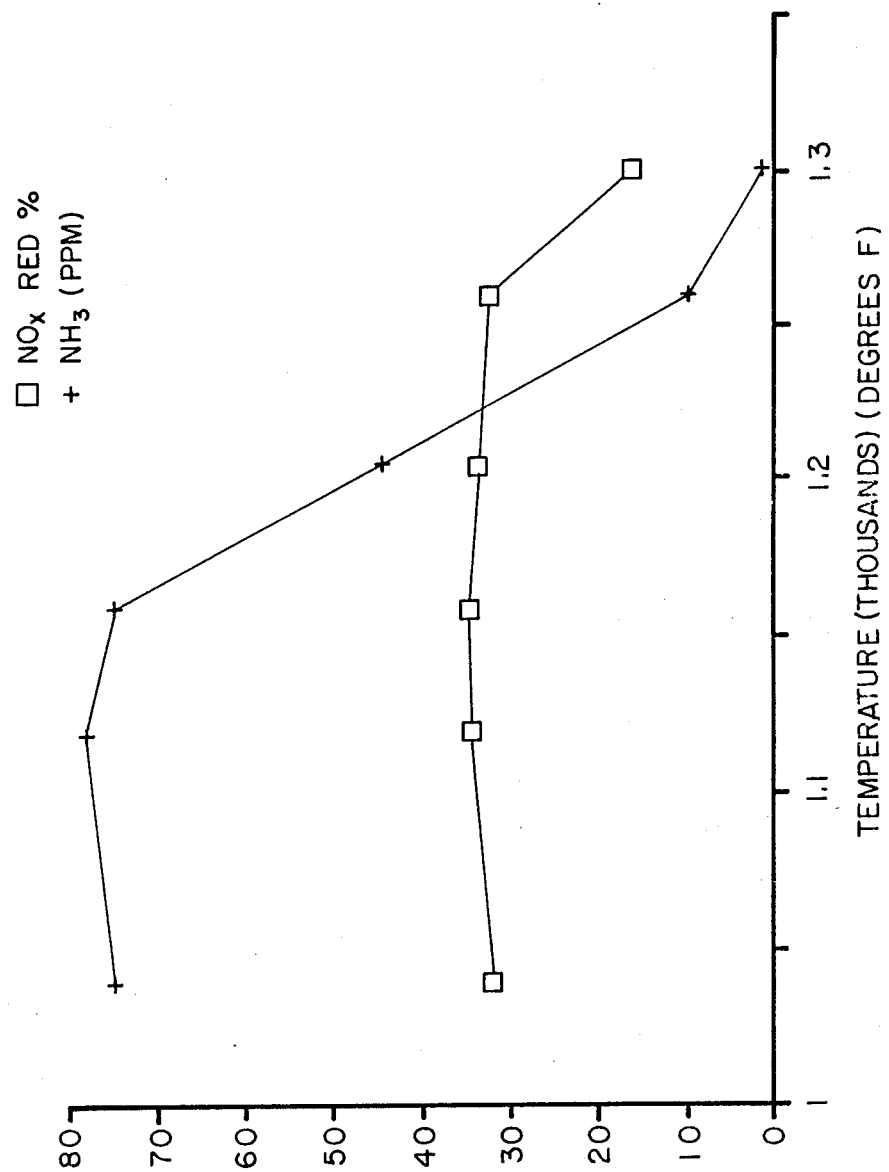

PROCESS FOR NITROGEN OXIDES REDUCTION WITH MINIMIZATION OF THE PRODUCTION OF OTHER POLLUTANTS

DESCRIPTION

1. Related Applications

This application is a continuation-in-part of copending and commonly assigned U.S. patent application having Ser. No. 022,799, entitled "Process for Reducing Nitrogen Oxides in an Effluent Using a Hydrocarbon or Hydrogen Peroxide" filed in the name of Sullivan on Mar. 6, 1987, now abandoned; copending and commonly assigned U.S. patent application having Ser. No. 050,198, entitled "Process for Nitrogen Oxides Reduction and Minimization of the Production of Other Pollutants" filed in the names of Epperly, O'Leary and Sullivan on May 14, 1987, now U.S. Pat. No. 4,780,289; copending and commonly assigned U.S. patent application having Ser. No. 108,779, entitled "Process for the Reduction of Nitrogen Oxides in an Effluent" filed in the names of Epperly, Sullivan and Sprague on Oct. 14, 1987, abandoned; and copending and commonly assigned U.S. patent application having Ser. No. 090,962, entitled "Process for the Reduction of Nitrogen Oxides in an Effluent" filed in the names of Epperly, Sullivan and Sprague on Aug. 28, 1987, now U.S. Pat. No. 4,777,024, the disclosures of each of which are incorporated herein by reference.

2. Technical Field

The present invention relates to a process for the reduction of nitrogen oxides ($NO_x$) in the effluent, especially the oxygen-rich effluent, from the combustion of a carbonaceous fuel while minimizing the production of other pollutants, such as ammonia ($NH_3$).

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used in suspension fired boilers such as large utility boilers, temperatures above about 2000° F. and typically about 2200° F. to about 3000° F. are generated Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. Nitrogen oxides can form even in circulating fluidized bed boilers which operate at temperatures which typically range from 1300° F. to 1700° F.

Nitrogen oxides are troublesome pollutants which are found in the combustion effluent streams of boilers when fired as described above, and comprise a major irritant in smog. It is further believed that nitrogen oxides can undergo a process known as photo-chemical smog formation, through a series of reactions in the presence of sunlight and hydrocarbons. Moreover, nitrogen oxides comprise a significant contributor to acid rain.

Unfortunately, the temperatures within a suspension fired or circulating fluidized bed boiler render most common methods of reducing $NO_x$ concentrations, such as effluent scrubbing or catalyst grids, either uneconomical, infeasible, or both, particularly when combined with the need to minimize the production of other pollutants such as ammonia ($NH_3$).

3. Background Art

Processes and compositions for the reduction of nitrogen oxides in an effluent from the combustion of a carbonaceous fuel have been developed extensively over recent years. With the increased attention to the health risks and environmental damage caused by agents such as smog and acid rain, it is expected that $NO_x$ reduction research will continue to be pursued.

In the past, most processes for the reduction of nitrogen oxides levels have concentrated on achieving maximum $NO_x$ reductions without addressing the problems raised by the production of other pollutants, such as ammonia. More recently, in a unique application of $NO_x$ reducing principles, Epperly, Peter-Hoblyn, Shulof and Sullivan, in U.S. patent application entitled "Multi-Stage Process for Reducing the Concentration of Pollutants in an Effluent" having Ser. No. 022,716, filed Mar. 6, 1987, now U.S. Pat. No. 4,777,024, disclose a method of achieving substantial $NO_x$ reductions without the production of a major amount of other pollutants through a multiple stage injection process. The disclosed process, though, is more concerned with maintaining a low level of other pollutants than with achieving a maximum amount of nitrogen oxides reduction because each injection is designed not to maximize $NO_x$ reduction but to minimize the production of other pollutants.

Although effective for reducing the level of nitrogen oxides in an effluent, the fact that the $NO_x$ reduction is not maximized at each injection indicates that further reductions are possible. Furthermore, even in the prior art disclosures which teach methods which may lead to a lessened production of other pollutants, most do so under relatively static conditions and do not account or compensate for changes in effluent conditions, such as effluent temperature variations as load varies, which are often encountered. There exists a present need, therefore, for a process which can achieve maximum nitrogen oxides reductions without the production of substantial amounts of other pollutants under practical effluent conditions.

DISCLOSURE OF INVENTION

The present invention meets this need and provides the ability to control $NO_x$ in concert with other pollutants under varying as well as constant load conditions in a manner and to a degree never before available. According to one aspect, the process comprises introducing (most commonly by injecting) a $NO_x$ reducing treatment agent comprising a hydrocarbon into an effluent according to a $NO_x$ reducing treatment regimen under conditions such that the hydrocarbon treatment agent is operating on the high temperature or right side of its nitrogen oxides reduction versus effluent temperature curve, especially on the high temperature or right side of the curve plateau.

An object of the present invention is to achieve significant reductions in nitrogen oxides levels without the production of substantial amounts of other pollutants such as ammonia by introducing a hydrocarbon treatment agent according to a treatment regimen while monitoring the condition of the effluent and, when a change in effluent condition is observed, adjusting the treatment regimen by varying one or more treatment regimen parameters to effect an adjusted treatment regimen which operates on its nitrogen oxides reduction versus effluent temperature curve further to the right than did the originally-effected treatment regimen on its nitrogen oxides reduction versus effluent temperature curve.

Another object of the present invention is to achieve significant reductions in nitrogen oxides levels without the production of substantial amounts of other pollutants such as ammonia by determining the nitrogen oxides reduction versus effluent temperature curves for each of a plurality of treatment regimen which effect the introduction of a hydrocarbon treatment agent and effecting the treatment regimen which will, under the effluent condition currently existing, operate furthest to the right on its curve than the others.

Still another object of the present invention is to achieve significant reductions in nitrogen oxides levels without the production of substantial amount of other pollutants such as ammonia by introducing a hydrocarbon treatment agent according to a treatment regimen and adjusting the position of introduction of the hydrocarbon treatment agent to cause the introduction to be performed at a different effluent temperature and thereby effect the treatment regimen to operate more towards the right side of the plateau of its nitrogen oxides reduction versus effluent temperature curve.

Yet another object of the present invention is to achieve significant reductions in nitrogen oxides levels without the production of substantial amounts of other pollutants such as ammonia by introducing a hydrocarbon treatment agent according to a treatment regimen under conditions effective to reduce the effluent nitrogen oxides concentration and then varying one or more treatment regimen parameters to shift the treatment regimen nitrogen oxides reduction versus effluent temperature curve towards the right side of the curve plateau.

Still another object of the present invention is to achieve significant reductions in nitrogen oxides levels without the production of substantial amounts of other pollutants such as ammonia by introducing a hydrocarbon treatment agent according to a treatment regimen, determining the position on its nitrogen oxides reduction versus effluent temperature curve at which the treatment regimen is operating and varying one or more treatment regimen parameters so that the varied treatment regimen is operating on its nitrogen oxides reduction versus effluent temperature curve further to the right.

Another object of the present invention is to achieve significant reductions in nitrogen oxides levels without the production of substantial amounts of other pollutants such as ammonia by introducing a hydrocarbon treatment agent according to a treatment regimen and varying one or more treatment regimen parameters to drive the reaction or series of reactions by which the treatment regimen reduces nitrogen oxides towards a reduction of the production of other pollutants while substantially maintaining the level of nitrogen oxides reductions.

Yet another object of the present invention is to achieve significant reductions in nitrogen oxides levels without the production of substantial amounts of other pollutants such as ammonia by introducing a hydrocarbon treatment agent according to a treatment regimen while monitoring boiler operating load and varying one or more treatment regimen parameters when a significant change in boiler load is observed to effect an adjusted treatment regimen.

Another object of the present invention is to achieve significant reductions in nitrogen oxides levels without the production of substantial amounts of other pollutants such as ammonia by introducing a hydrocarbon treatment agent according to a treatment regimen under conditions where the treatment regimen is operating on its nitrogen oxides reduction versus effluent temperature curve at a position to the right of the curve plateau and adjusting one or more treatment regimen parameters to operate the adjusted treatment regimen towards its curve plateau.

BRIEF DESCRIPTION OF THE DRAWINGS

These and other objects will be described and the present invention better understood and its advantages more apparent in view of the following detailed description, especially when read with reference to the appended drawings, wherein:

FIG. 1 graphically represents the results of Example I.

DEFINITIONS

As used in this description, the term:

"nitrogen oxides reduction versus effluent temperature curve" refers to a plot of the data points generated when a treatment regimen is effected by introducing a treatment agent comprising a hydrocarbon into an effluent over a range of effluent temperatures and the nitrogen oxides reduction at each introduction temperature is measured (and usually expressed in terms of percent of baseline);

"curve plateau" refers to that region of a nitrogen oxides reduction versus effluent temperature curve where the $NO_x$ reduction is substantially maximized over a range of temperatures and preferably encompasses at least two data points (of course a skilled artisan will recognize that a curve plateau will not necessarily be flat due to "data scatter" and other practical data generation effects);

"high temperature side" or "right side" refer to any point on the subject nitrogen oxides reduction versus effluent temperature curve which represents the reduction achieved when a treatment regimen is effected at a higher temperature than the original temperature at which the treatment regimen was effected;

"treatment regimen" refers to the introduction (such as by injection) of a treatment agent comprising a hydrocarbon into an effluent and the conditions under which the hydrocarbon treatment agent is introduced, such as treatment agent components (by which is meant the specific ingredients, including the particular hydrocarbons employed, or chemical formulation of the treatment agent), treatment agent dilution (by which is meant the concentration of treatment agent components when the hydrocarbon treatment agent used comprises a solution), relative presence of treatment agent components (by which is meant the relative weight ratio or fractions of the components which form the chemical formulation which makes up the hydrocarbon treatment agent), etc.;

"treatment agent" refers to a composition comprising at least one reductant chemical, i.e., a pollution reducing chemical capable of reducing $NO_x$, sulfur oxides ($SO_x$) or other pollutants by facilitating a reaction (the term "reaction" will be understood to refer to a single reaction or a series of reactions), and, preferably, with a solvent. Reductant chemicals of interest for this invention are hydrocarbons;

"effluent condition" or "condition of the effluent" refers to the existing state of any one or more parameters which can be used to characterize the effluent, such as temperature, nitrogen oxides level, ammonia level, excess oxygen level, sulfur oxides level, etc.;

"hydrocarbon" refers to substituted and unsubstituted, straight or branch-chain aliphatic and cyclic, heterocyclic and aromatic hydrocarbons, and mixtures thereof. Typical substituent groups useful herein include carboxylic acid groups (COOH), hydroxy groups (OH), and amino groups (NH$_2$);

"oxygenated hydrocarbon" refers to a hydrocarbon which contains oxygen or an oxygen-containing group;

"nitrogenated hydrocarbon" refers to a hydrocarbon which contains nitrogen or a nitrogen-containing group (it will be recognized that the terms "oxygenated hydrocarbon" and "nitrogenated hydrocarbon" are not mutually exclusive in scope but, rather, can overlap in coverage, i.e., some hydrocarbons may be both oxygenated hydrocarbons and nitrogenated hydrocarbons); and "sugar" refers to a number of useful saccharide materials which are capable of decreasing the NO$_x$ concentration in an effluent under conditions as described herein, including non-reducing and reducing water soluble mono-saccharides and the reducing and non-reducing polysaccharides and their degradation products, such as pentoses including aldopentoses, methyl pentoses, keptopentoses like xylose and arabinose, deoxyaldoses like rhaminose, hexoses and reducing saccharides such as aldo hexoses like glucose, galactose and mannose, ketohexoses like fructose and sorbose, disaccharides like lactose and maltose, non-reducing disaccharides like sucrose and other polysaccharides such as dextrin and raffinose, hydrolyzed starches which contain as their constituents oligosaccharides, and water dispersible polysaccharides.

BEST MODE FOR CARRYING OUT THE INVENTION

The present invention generally comprises introducing (most commonly by injecting) a NO$_x$ reducing treatment agent comprising a hydrocarbon into an effluent from the combustion of a carbonaceous fuel according to a NO$_x$ reducing treatment regimen under conditions such that the hydrocarbon treatment agent is effective at significantly reducing the nitrogen oxides concentration in the effluent without the production of a substantial amount of other pollutants, especially ammonia, at effluent temperatures below about 1450° F., more preferably about 1300° F. When practiced most effectively, this invention can lead to the maximization of the NO$_x$ reduction achievable while minimizing the production of such other pollutants.

The availability of a process for reducing the nitrogen oxides concentration in an effluent which is at temperatures below about 1450° F., and even below 1300° F. is desirable because access to the effluent stream of a large industrial boiler at a location where the temperature is in the higher ranges, i.e., above about 1450° F., which is the optimal range for most prior art systems, is not always possible without major redesign of the boiler because of exterior water jacketting and interior water tubes. To be practical for many situations, therefore, a NO$_x$-reducing system must either be effective in the extremely high temperature flame area of the boiler or be effective in the relatively low temperature downstream or exhaust area of the boiler. This invention provides the latter in an economical and effective process for reducing the nitrogen oxides concentration in the effluent from the combustion of a carbonaceous fuel at such low temperatures while effectively minimizing the production of other pollutants such as ammonia.

For the purposes of this description, all temperatures herein are measured using an unshielded K-type thermocouple. Unless otherwise indicated, all parts and percentages are based on the weight of the composition at the particular point of reference.

The preferred hydrocarbons suitable for use in this invention are nitrogenated and non-nitrogenated hydrocarbons, especially oxygenated hydrocarbons such as low molecular weight ketones, aldehydes, mono, di or polyhydric alcohols of aliphatic hydrocarbons and hydroxy amino hydrocarbons such as monoethanolamine and amino acetic acid (glycine).

Preferred treatment agents include ethylene glycol, furfural, methanol, sugar (especially molasses) and glycerol, with ethylene glycol and sugar being most preferred of these. Other nitrogenated hydrocarbons which can advantageously be employed in the process of this invention are monomethylamine, triethylene tetramine, hexamethylenediamine, tetraethylene pentamine, bis-hexamethylene triamine, polyamine HpA, 1,2-diaminopropane, N,N-dimethylethylenediamine, tetramethylethylenediamine, 2-methylaziridine, bis (3-aminopropyl) ethylenediamine, tetramethyldiaminomethane, ehtylenediamine, diethylene triamine and ammonium salts of organic acids which include the ammonium salts of acetic acid (ammonium acetate), substituted and unsubstituted benzoic acid (ammonium benzoate), oxalic acid (crystallized) (ammonium binoxalate), caprylic acid (ammonium caprylate), citric acid (ammonium citrate), oleic acid (ammonium oleate) and propionic acid (ammonium propionate).

Additionally, hydrocarbons such as NH$_4$-lignosulfonate, calcium lignosulfonate, 2-furoic acid, 1,3-dioxalane, 1,4-dioxane, tetrahydrofuran, furfurylamine, furfurylalcohol, gluconic acid, formic acid, n-butyl acetate, 1,3-butylene glycol, methylal, tetrahydrofuryl alcohol, furan, fish oil (menhaden oil), coumalic acid, furfuryl acetate, tetrahydrofuran, 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, mucic acid and d-galactose are also useful in the practice of the present invention.

Mixtures of polyols, such as those mixtures of low molecular weight polyols known as hydrogenated starch hydrosylates, can also be advantageously employed. Additional hydrocarbons which are suitable for use in the present invention include paraffinic, olefinic and aromatic hydrocarbons, including naphtha-based hydrocarbons and mixtures of petroleum products such as fuels, and mixtures thereof.

Mixtures of two or more of the above-described hydrocarbons can also be advantageously employed in this invention.

The hydrocarbon of the treatment agent of this invention can be used alone in its pure form, in dispersions, such as aqueous dispersions or in solution, preferably aqueous solutions due to the economy of aqueous solutions, although there may be instances where other solvents may be advantageously used, either alone or in combination with water, as would be known to the skilled artisan. The level of the hydrocarbon employed should be that level necessary to elicit reductions in the concentration of nitrogen oxides in the effluent. Advantageously, the hydrocarbon is employed within the parameters of the inventive process at a weight ratio of hydrocarbon to the baseline nitrogen oxides level of about 0.5:1 to about 25:1. The weight ratio of hydrocarbon to the baseline nitrogen oxides level is more preferably about 0.5:1 to about 10:1 and is most preferably about 1:5 to about 5:1.

The effluent into which the hydrocarbon treatment agent of this invention is injected is preferably oxygen-rich, meaning that there is an excess of oxygen in the effluent. Advantageously, the excess of oxygen is greater than about 1% by volume. Most preferably, the excess of oxygen is in the range of about 1% to about 16% by volume.

The hydrocarbon treatment agent utilized according to this invention is preferably injected at a number of spaced positions from nozzles or other apparatus which are effective to uniformly distribute the hydrocarbon treatment agent through the combustion effluent.

The nitrogen oxides reduction versus effluent temperature curve for a hydrocarbon treatment agent introduced according to a treatment regimen comprises a curve plateau, which, as described above, indicates where the $NO_x$ reduction elicited by the treatment regimen is maximized and that such maximum level is substantially maintained over a range of effluent temperatures. An exemplary nitrogen oxides reduction versus effluent temperature curve for a treatment regimen disclosed as being an effective nitrogen oxides reducing treatment regimen is reproduced in FIG. 1. FIG. 1 contains the nitrogen oxides reduction versus effluent temperature curve for a treatment regimen comprising the introduction of a treatment agent which comprises 15% by weight of ethylene glycol, which is injected into an effluent at the rate of 274.5 gm/hr. and an excess of oxygen in the effluent of from 3.0% to 4.0% by volume.

The curve plateau for FIG. 1 will be recognized as the nitrogen oxides reduction achieved by effecting the disclosed treatment regimen between effluent temperatures of 1040° F. and 1260° F. (the skilled artisan will recognize that due to normal experimental variations, the curve plateau, and indeed the nitrogen oxides reduction versus effluent temperature curve itself, for any given treatment agent and associated treatment regimen will show minor variations each time it is experimentally derived). This temperature range, it will be observed, provides the maximum nitrogen oxides reduction for this treatment regimen.

Merely maximizing the nitrogen oxides reduction, though, is not enough. Of concern is not only the nitrogen oxides level in the effluent, but also the level of other pollutants, the most important of which is ammonia, which is often produced in the $NO_x$ reducing process. The presence of ammonia in the effluent should be avoided because, among other reasons, it can react with $SO_3^=$ to form ammonium bisulfate which can foul heat exchange surfaces in a boiler. Moreover, ammonia has detrimental effects on ambient air quality, as has carbon monoxide. If the maximization of the nitrogen oxides level brings about the production of significant amounts of other pollutants, then such maximization is counterproductive. As discussed above, the prior art has attempted to rectify this by eliciting only that level of nitrogen oxides reduction as can be achieved without the production of other pollutants.

Surprisingly, a process for maximizing the nitrogen oxides reduction while minimizing the production of ammonia has now been found. It has been determined that operation on the high temperature or right side of the nitrogen oxides reduction versus effluent temperature curve of a hydrocarbon treatment agent introduced according to a treatment regimen substantially reduces the production of other pollutants such as ammonia. In fact, it has been found that operation on a nitrogen oxides reduction versus effluent temperature curve plateau at any point further to the right of present operation will reduce the production of other pollutants while maintaining maximum nitrogen oxides reduction.

This surprising and advantageous result is aptly demonstrated by reference to FIG. 1, which graphically represents the results of Example I. As previously discussed, FIG. 1 reproduces the nitrogen oxides reduction versus effluent temperature curve for a treatment regimen which is effective at reducing the nitrogen oxides level in an effluent from the combustion of a carbonaceous fuel. FIG. 1 also contains the ammonia levels observed at each point on the curve. It can be seen that although $NO_x$ reduction is maximized throughout the curve plateau (i.e., injection in the effluent temperature range of about 1040° F. to about 1260° F.), performing the injection further to the right on the curve plateau (i.e., at higher temperatures in the plateau temperature range) leads to substantially reduced production of ammonia.

Operation further to the right on the curve can be achieved in one of two methods. First, the position on the curve at which the treatment regimen being used is being effected can be translated further to the right by effecting the treatment regimen (i.e., by introducing the hydrocarbon treatment agent) at a higher effluent temperature. It will readily be observed by reference to FIG. 1 that effecting the treatment regimen at a higher effluent temperature will translate the position of operation on the curve further to the right, thereby reducing the production of ammonia while maintaining maximum nitrogen oxides reduction.

As noted, effecting the treatment regimen at a higher effluent temperature can be accomplished by performing the hydrocarbon treatment agent introduction at a location where the effluent temperature is higher, i.e., at a location upstream (or closer to the flame zone) from the original introduction location. This method for effecting the treatment regimen at a higher effluent temperature can oftimes be impractical because access to the boiler interior is often limited to specific points, due to water tubing, etc. Introduction at a location where the effluent temperature is at a desired level, therefore, is often not possible. Operation at a much higher effluent temperature can translate the position of operation on the curve too far to the right and off the plateau, thereby decreasing $NO_x$ reduction.

Altering the operating load of the boiler (i.e., fuel supply rate) will also cause a change in effluent temperature and, theoretically at least, be used to increase effluent temperature at the hydrocarbon treatment agent introduction location by increasing operating load. In practice, though, altering the boiler operating load is not preferred because the effluent condition is altered in more than the temperature parameter, as will be discussed in more detail below. Nitrogen oxides level, as well as other parameters such as ammonia level, are altered along with effluent temperature Furthermore, the boiler operating load is usually maintained at a certain level to produce a specific, required output and is not available as a factor which can be altered to achieve $NO_x$ reduction.

The second method for operating further to the right on the curve is to vary one or more of the parameters of the treatment regimen being effected. For instance, the varied parameter can be the particular components of the hydrocarbon treatment agent, the dilution of the treatment agent when in solution with a concomitant variation in treatment agent introduction rate, the relative presence of treatment agent components, or combinations of any of the above. By varying treatment regimen parameters, the original nitrogen oxides reduction versus effluent temperature curve is replaced by the nitrogen oxides reduction versus effluent temperature curve for the varied treatment regimen. Selection of the parameter(s) to be varied and in what way they are varied can replace the original curve with a curve which is "shifted" to the left, thereby leading to operation on the shifted curve at a position further to the right.

Of course, the two methods for operating further to the right on the curve plateau disclosed according to the present invention are not mutually exclusive, but can in fact be combined In other words, the effluent temperature can be varied along with one or more treatment regimen parameters.

Although it is possible to translate the performance of the treatment regimen further to the right on its curve plateau by effecting the treatment regimen at a higher temperature (i.e., by introducing the hydrocarbon treatment agent at a location where the effluent temperature is higher), as discussed above it is more likely that the $NO_x$ reduction will be maximized while minimizing the production of ammonia by the second of the two disclosed methods, i.e., by varying one or more treatment regimen parameters. The adjustment (or varying) of the treatment regimen is performed to drive the reaction by which the hydrocarbon treatment agent facilitates the reduction of $NO_x$ towards the right side of the curve plateau.

As discussed above, varying one or more treatment regimen parameters serves to produce an adjusted (or new) treatment regimen which will have a different (or shifted) nitrogen oxides reduction versus effluent temperature curve compared to the original treatment regimen By prior analysis of possible treatment regimens and knowledge of their particular nitrogen oxides reduction versus effluent temperature curves, one can determine the treatment regimen that will, when effected in place of the original treatment regimen, operate further to the right on its curve than the original treatment regimen operated on its curve. In fact, one can predict which will operate furthest to the right on the curve plateau under the particular conditions at which introduction is desired (i.e., the effluent temperature at the location for introduction of the hydrocarbon treatment agent).

Furthermore, if the effluent temperature at the introduction location is known, prior knowledge of the nitrogen oxides reduction versus effluent temperature curves of available treatment regimens will allow initial selection of the treatment regimen which operates furthest to the right while remaining on the curve plateau, eliminating the need for varying any of the parameters.

Another advantageous aspect of the present invention is in the situation where an effluent from the combustion of a carbonaceous fuel is required to have no more than a maximum level of another pollutant, such as ammonia. The process of this invention can be used to achieve the maximum possible $NO_x$ reduction, or a target level of $NO_x$ reduction, while maintaining the level of such other pollutants under such maximum level.

This can be accomplished using the rate of introduction and dilution of the hydrocarbon treatment agent. It will be recognized that as the rate of introduction of a treatment agent increases, the nitrogen oxides reduction elicited by that treatment regimen effected increases as does the production of other pollutants. This fact can be utilized by effecting a treatment regimen at a relatively low rate of introduction and/or high dilution and at the right side of the treatment regimen curve plateau (the treatment regimen can be effected at the right side of its curve plateau by any of the methods for effecting a treatment agent at the right side of its curve plateau discussed herein). The treatment regimen can then be varied by increasing introduction rate of the hydrocarbon treatment agent or decreasing the dilution of the hydrocarbon treatment agent until the maximum level of such other pollutant is reached. If there is more than one other pollutant which has a maximum level, the treatment regimen is varied in this way until the first of such other pollutants reaches its maximum level. In this way, the highest possible $NO_x$ reduction can be achieved while maintaining the effluent in a condition which is below the maximum level for other pollutants.

Similarly, when a target level of nitrogen oxides is desired, the treatment regimen can be varied as described above until the nitrogen oxides reduction is sufficient to attain that level of nitrogen oxides, provided that a maximum level of other pollutants is not surpassed. In this way, if the treatment regimen is operating on the right side of its curve plateau, the target level of $NO_x$ is attained while a minimum of other pollutants such as ammonia are produced.

In another advantageous aspect of this invention, the process of this invention can be used to reduce $NO_x$ levels while minimizing the production of other pollutants through "load following." "Load following" refers to a process which involves adjusting the treatment regimen which is being effected in response to the operating load at which the boiler is being fired. When the boiler operating load changes, a change in effluent temperature occurs. Such a change in temperature of the effluent, it will be apparent, causes the point of operation on the nitrogen oxides reduction versus effluent temperature curve for the current treatment regimen to be translated either to the left, and hence away from minimization of other pollutants, or to the right, potentially off the curve plateau and onto the right side slope of the curve, and hence away from maximum nitrogen oxides reduction.

By replacing the current treatment regimen with a new treatment regimen, i.e., by adjusting one or more treatment regimen parameters such as dilution and introduction rate of the hydrocarbon treatment agent, components of the hydrocarbon treatment agent and relative presence of hydrocarbon treatment agent components, the nitrogen oxides reduction versus effluent temperature curve is shifted (i.e., replaced with a new nitrogen oxides reduction versus effluent temperature curve) so that operation after the change is once again towards the right side of the curve plateau.

Furthermore, as discussed above, a change in boiler operating load leads to more than merely a change in effluent temperature Frequently, a change in boiler load produces a change in the effluent with regard to $NO_x$ level. This becomes especially important when there is a maximum level of other pollutants which has to be met or a target level of nitrogen oxides reduction which has to be attained. The change in $NO_x$ level can be measured directly or, preferably, can be determined using a load-dependent boiler characterization factor.

For a given boiler and fuel, the characterization factor relates the $NO_x$ level and temperature of the effluent at given locations to boiler load, and it is determined experimentally. With this information, the treatment regimen being effected at a given location can be adjusted immediately upon change of boiler operating load as measured by fuel supply rate, for example. As a result, when load is reduced, the treatment regimen feed rate is reduced to achieve the introduction rate of the hydrocarbon treatment agent needed to attain target reductions at that load and the hydrocarbon treatment agent components are varied as necessary to respond to the temperature change resulting from the change in operating load. If the feed rate of the treatment regimen were not reduced, the introduction rate would be excessive in view of the lower level of $NO_x$ and excessive $NH_3$ would be produced. Similarly, when boiler operating load is increased, the feed rate of the treatment regimen is increased to achieve the introduction rate of the hydrocarbon treatment agent needed at that load. Otherwise, the introduction rate would be low and $NO_x$ reduction would be inadequate. Again, the components of the treatment agent are adjusted to compensate for the effluent temperature change associated with the change in boiler operating load.

This characterization factor is dependent on boiler geometry, fuel type and boiler load and can be determined experimentally. Several other parameters such as number of burners in service affect the characterization factor, but those that are mentioned above are most important. By reference to the characterization factor for a given boiler and fuel, the nitrogen oxides level and temperature at a given location can be determined to a sufficient degree of certainty to permit the determination of how the treatment regimen should be adjusted to correct for translation on the nitrogen oxides reduction versus effluent temperature curve which occurs when the operating load is changed.

The preferred embodiment for maximizing nitrogen oxides reduction and controlling the production of other pollutants is by effecting a first treatment regimen which operates at the effluent temperatures currently existing on the right hand slope, off the curve plateau, of the treatment regimen's nitrogen oxides reduction versus effluent temperature curve. By knowledge of the effluent temperature and the curve for a plurality of treatment regimens, this can be simply accomplished using means described above. Once done, the treatment regimen can be adjusted, by means which will be apparent to the skilled artisan upon reading this disclosure, to bring the operation thereof "up" and onto the curve plateau. In other words, the curve can be shifted to do so. By this method, it can be assured that the treatment regimen being effected is operating as far to the right while still on its curve plateau as possible. The nitrogen oxides reduction is thus maximized while the production of other pollutants is thus controlled.

Another surprising aspect of this invention is in the use of a treatment regimen as a probe for effluent conditions. If the nitrogen oxides reduction versus effluent temperature curve (or, in fact, the ammonia production versus effluent temperature curves) for a treatment regimen is known, the effluent condition after that treatment regimen is effected will provide useful information about the effluent condition downstream from the location the treatment regimen is effected, it can even provide information on boiler operating load. For instance, if the nitrogen oxides level is relatively low, but the level of production of other pollutants is relatively high, then it can be assumed that the treatment regimen is operating on the left side of its curve plateau. Using this information, the effluent temperature can be determined with a reasonable degree of accuracy and, using the boiler characterization factor described above, the boiler load can be determined. Similarly, if the $NO_x$ and ammonia levels are all low, it can be assumed that the treatment regimen is operating on the right side slope, off the curve plateau, of its curve. Effluent temperature and boiler operating load can then be determined therefrom. The more intimate familiarity with the treatment regimen's curve, the more accurate the determinations can be.

It will be understood that there are significant temperature variations at any given boiler location, associated with effluent flow patterns, boiler firing conditions, wall effects, etc. A regimen effected at a boiler location and tailored to operate on the right side of its nitrogen oxides reduction versus effluent temperature curve when exposed to the median effluent temperature at such location will probably operate on the left side in a low temperature area within the location. The low temperature areas will result in production of ammonia, as apparent from a review of this disclosure. This effect can be minimized by minimizing treatment of the low temperature areas, such as by use of suitable injectors (familiar to the skilled artisan), by tailoring the treatment regimen to the low temperature areas, or by a multiple injection system utilizing both methods.

It will further be understood that although operation on a nitrogen oxides reduction versus effluent temperature curve plateau is preferred, in some situations operating on the right side slope, off the plateau, can be desired, in order to maintain the production of other pollutants at a low level while still achieving significant reduction of nitrogen oxides.

It will also be understood that the process of this invention is also useful as a discrete step in combination with other chemical, catalytic or other procedures for reducing nitrogen oxides concentrations as well as other pollutants such as sulfur dioxide ($SO_2$), while preferably controlling levels of residual pollutants such as ammonia. Such a suitable "multi-step" process is disclosed in copending and commonly assigned U.S. patent application having Ser. No. 022,716, entitled "Multi-Stage Process for Reducing the Concentration of Pollutants in an Effluent", filed in the names of Epperly, Peter-Hoblyn, Shulof, Jr and Sullivan on Mar. 6, 1987, now U.S. Pat. No. 4,777,024, the disclosure of which is incorporated herein by reference.

The following example further illustrates and explains the invention by detailing the operation of a treatment regimen using "right side of the curve" methods.

EXAMPLE I

The burner used is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia, carbon dioxide, percent excess oxygen and other compounds of interest which may be present in the effluent. The effluent flue conduit additionally has thermocouple ports for temperature measurement at various locations. The temperature of the effluent into which the hydrocarbon treatment agent is injected is measured at the location of injection utilizing a K-type thermocouple. Atomizing injectors described in copending U.S. patent application entitled "Process and Apparatus for Reducing the Concentration of Pollutants in an Effluent" having Ser. No. 009,696, filed in the name of Burton on Feb. 2, 1987, the disclosure of which is incorporated herein by reference, are positioned through ports in the efflunt flue conduit in order to introduce and distribute the treatment agent into the effluent stream. The agent is injected into the effluent at a rate of 274.5 gr/hr. The burner fuel is a Number 2 fuel oil, and the burner is fired at a rate of 5.9 to 7.1 lbs/hr with an excess of oxygen of 3.0% to 4.0% by volume.

A baseline nitrogen oxides concentration reading is taken prior to beginning each run to calculate the injection ratio of treatment agent to baseline nitrogen oxides, and a final nitrogen oxides reading is taken during and downstream from injection of the treatment agent to calculate the reduction in the nitrogen oxides concentration in the effluent elicited by each of the treatment agents injected. Moreover, an ammonia reading is taken during and downstream from injection of the treatment agents to calculate the production of other pollutants.

An aqueous solution comprising 15% by weight of ethylene glycol and 0.1% by weight of a commercially available surfactant is injected into the effluent at the indicated temperatures. The results are set out in Table 1 and reproduced graphically in FIG. 1.

TABLE 1

| Temp. (° F.) | $NO_x$ (ppm) Baseline | $NO_x$ (ppm) Final | % Red. | $NH_3$ (ppm) |
| --- | --- | --- | --- | --- |
| 1040 | 203 | 138 | 32.0 | 75.0 |
| 1120 | 207 | 136 | 34.3 | 78.0 |
| 1160 | 196 | 128 | 34.7 | 75.0 |
| 1205 | 184 | 122 | 33.7 | 44.5 |
| 1260 | 187 | 126 | 32.6 | 10.0 |
| 1300 | 193 | 161 | 16.6 | 1.4 |

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for reducing the concentration of nitrogen oxides in an effluent which is at a temperature below about 1450° F. while minimizing the production of other pollutants, the process comprising:
   a. determining the condition of the effluent which exists at a location for introduction of a treatment agent;
   b. effecting a treatment regimen which comprises introducing a treatment agent comprising a hydrocarbon into the effluent to reduce the nitrogen oxides concentration in the effluent under said determined effluent conditions while minimizing the production of other pollutants;
   c. monitoring the condition of the effluent until a significant alteration in the condition of the effluent is observed;
   d. adjusting said treatment regimen by varying at least one of the following parameters
      (i) dilution and introduction rate of said hydrocarbon treatment agent;
      (ii) composition of said hydrocarbon treatment agent; and
      (iii) relative presence of the components of said hydrocarbon treatment agent,
      to effect an adjusted treatment regimen, wherein said adjusted treatment regimen operates under conditions effective to reduce the nitrogen oxides concentration in the effluent under said altered effluent conditions while minimizing the production of other pollutants.

2. The process of claim 1 wherein said other pollutant comprises ammonia.

3. The process of claim 2 wherein said hydrocarbon is selected from the group consisting of oxygenated hydrocarbons and nitrogenated hydrocarbons.

4. The process of claim 3 wherein said oxygenated hydrocarbon is selected from the group consisting of low molecular weight ketones, aldehydes, mono, di or polyhydric alcohols of aliphatic hydrocarbons and mixtures thereof.

5. The process of claim 4 wherein said oxygenated hydrocarbon is selected from the group consisting of ethylene glycol, methanol, furfural, sugar and glycerol and mixtures thereof.

6. The process of claim 1 wherein said nitrogenated hydrocarbon comprises ammonium salts of organic acids and mixtures thereof.

7. The process of claim 6 wherein said ammonium salts of inorganic acids are selected from the group consisting of ammonium acetate, ammonium benzoate, ammonium binoxalate, ammonium caprylate, ammonium citrate, ammonium oleate and ammonium propionate and mixtures thereof.

8. The process of claim 3 wherein said hydrocarbon is selected from the group consisting of $NH_4$-lignosulfonate, calcium lignosulfonate, 2-furoic acid, 1,3-dioxalane, 1,4-dioxane, tetrahydrofuran, furfurylamine, furfurylalcohol, gluconic acid, formic acid, n-butyl acetate, 1,3-butylene glycol, methylal, tetrahydrofuryl alcohol, furan, fish oil (menhaden oil), coumalic acid, furfuryl acetate, tetrahydrofuran, 2,3,4,5-tetracarboxylic acid, tetrahydrofurylamine, furylacrylic acid, tetrahydropyran, 2,5-furandimethanol, mannitol, hexamethylenediamine, barbituric acid, acetic anhydride, mucic acid and d-galactose and mixtures thereof.

9. The process of claim 1 wherein said hydrocarbon is present in solution.

10. The process of claim 1 wherein the monitored condition of the effluent is selected from the group consisting of boiler operating load, effluent temperature at the location where said hydrocarbon treatment agent is introduced, nitrogen oxides level, ammonia level, carbon monoxide level, excess oxygen level and combinations thereof.

11. The process of claim 10 wherein said monitored effluent condition is effluent temperature at the location where said hydrocarbon treatment agent is introduced.

12. The process of claim 11 wherein said effluent temperature is below about 1300° F.

13. A process for reducing the concentration of nitrogen oxides in an effluent which is at a temperature below about 1450° F. while minimizing the production of other pollutants, the process comprising:
  a. determining the nitrogen oxides reduction versus effluent temperature curve for each of a plurality of treatment regimens which comprise introducing a treatment agent comprising a hydrocarbon;
  b. ascertaining which treatment regimen which, when effected to treat an effluent at the effluent temperature existing at the location for injection, acts within its curve plateau at the point furthest to the right; and
  c. effecting said ascertained treatment regimen to treat the effluent under conditions effective to reduce the nitrogen oxides concentration of the effluent while substantially avoiding the production of other pollutants.

14. The process of claim 13 wherein said other pollutant comprises ammonia.

15. The process of claim 14 wherein said hydrocarbon is selected from the group consisting of oxygenated hydrocarbons and nitrogenated hydrocarbons.

16. The process of claim 15 wherein said oxygenated hydrocarbon is selected from the group consisting of low molecular weight ketones, aldehydes, mono, di or polyhydric alcohols of aliphatic hydrocarbons and mixtures thereof.

17. The process of claim 16 wherein said oxygenated hydrocarbon is selected from the group consisting of ethylene glycol, methanol, furfural, sugar and glycerol and mixtures thereof.

18. The process of claim 15 wherein said nitrogenated hydrocarbon comprises ammonium salts of organic acids and mixtures thereof.

19. The process of claim 13 wherein said hydrocarbon is present in solution.

20. A process for the reduction of the concentration of nitrogen oxides in an effluent which is at a temperature below about 1450° F. while minimizing the production of other pollutants, the process comprising introducing a treatment agent which comprises a hydrocarbon having a known nitrogen oxides reduction versus effluent temperature curve which has a recognizable plateau into the effluent under conditions effective to reduce the concentration of nitrogen oxides in the effluent through a reaction or series of reactions facilitated by said hydrocarbon treatment agent and adjusting the introduction location to thereby cause said hydrocarbon treatment agent introduction to be performed at a different effluent temperature below about 1450° F. to drive said reaction or series of reactions towards the right side of the plateau of said nitrogen oxides reduction versus effluent temperature curve.

21. A process for reducing the concentration of nitrogen oxides in an effluent which is at a temperature below about 1450° F. while minimizing the production of other pollutants, the process comprising:
  a. determining the condition of the effluent which exists at a location for treatment agent introduction;
  b. introducing a treatment agent which comprises a hydrocarbon having a known nitrogen oxides reduction versus effluent temperature curve having a recognizable plateau into the effluent, which hydrocarbon treatment agent is effective to reduce the nitrogen oxides concentration of the effluent at the determined effluent conditions through a reaction or series of reactions facilitated by said hydrocarbon treatment agent;
  c. adjusting the components, dilution/introduction rate or relative presence of components of said hydrocarbon treatment agent to shift said curve and thereby cause the introduction of said hydrocarbon treatment agent to operate on the right side of the plateau of said shifted nitrogen oxides reduction versus effluent temperature curve.

22. The process of claim 21 wherein said hydrocarbon is selected from the group consisting of oxygenated hydrocarbons and nitrogenated hydrocarbons.

23. The process of claim 22 wherein said oxygenated hydrocarbon is selected from the group consisting of low molecular weight ketones, aldehydes, mono, di or polyhydric alcohols of aliphatic hydrocarbons and mixtures thereof.

24. The process of claim 23 wherein said oxygenated hydrocarbon is selected from the group consisting of ethylene glycol, methanol, furfural, sugar and glycerol and mixtures thereof.

25. The process of claim 24 wherein said effluent temperature is below about 1300° F.

26. The process of claim 22 wherein said nitrogenated hydrocarbon comprises ammonium salts of organic acids and mixtures thereof.

27. A process for reducing the concentration of nitrogen oxides in an effluent which is at a temperature below about 1450° F. while minimizing the production of other pollutants, the process comprising:
  a. introducing a treatment agent comprising a hydrocarbon into the effluent under conditions effective to reduce the concentration of nitrogen oxides in the effluent through a reaction or series of reactions facilitated by said hydrocarbon treatment agent; and
  b. varying at least one of the following parameters
    (i) dilution and introduction rate of said hydrocarbon treatment agent;
    (ii) components of said hydrocarbon treatment agent;
    (iii) relative presence of hydrocarbon treatment agent components; and
    (iv) injection position,
    wherein said reaction or series of reactions are driven towards a reduction of the production of other pollutants while substantially maintaining the level of nitrogen oxides reduction.

28. The process of claim 27 wherein said other pollutant comprises ammonia.

29. The process of claim which further comprises increasing the introduction rate of said hydrocarbon treatment agent until a predetermined maximum level of other pollutants is substantially attained but not surpassed.

30. The process of claim 28 which further comprises increasing the introduction rate of said hydrocarbon treatment agent until a predetermined target level of nitrogen oxides reduction is substantially attained provided that a predetermined maximum level of other pollutants is not surpassed.

31. A process for reducing the concentration of nitrogen oxides in an effluent which is at a temperature below about 1450° F. while minimizing the production of other pollutants, the process comprising:
  a. effecting a first treatment regimen which comprises introducing a treatment agent which comprises a hydrocarbon into the effluent to treat the effluent under conditions effective to reduce the nitrogen oxides concentration in the effluent through a reaction or series of reactions facilitated by said first treatment regimen;

b. determining the position on the nitrogen oxides reduction versus effluent temperature curve for said hydrocarbon treatment agent at which said first treatment regimen is being effected;

c. adjusting said first treatment regimen by varying at least one of the following parameters
   (i) dilution and introduction rate of said hydrocarbon treatment agent;
   (ii) components of said hydrocarbon treatment agent; and
   (iii) relative presence of the components of said hydrocarbon treatment agent, to effect a second treatment regimen; and d. determining the location on the nitrogen oxides reduction versus effluent temperature curve for said second treatment regimen at which said second treatment regimen is being effected, wherein the location at which said second treatment regimen is being effected is further to the right on its nitrogen oxides reduction versus effluent temperature curve than the location at which said first treatment regimen is being effected on its nitrogen oxides reduction versus effluent temperature curve.

32. The process of claim 31 which further comprises repeating steps c and d until a predetermined maximum level of the presence of other pollutants is substantially attained but not surpassed.

33. The process of claim 31 wherein said hydrocarbon is selected from the group consisting of oxygenated hydrocarbons and nitrogenated hydrocarbons.

34. The process of claim 31 wherein said oxygenated hydrocarbon is selected from the group consisting of low molecular weight ketones, aldehydes, mono, di or polyhydric alcohols of aliphatic hydrocarbons and mixtures thereof.

35. The process of claim 34 wherein said oxygenated hydrocarbon is selected from the group consisting of ethylene glycol, methanol, furfural, sugar and glycerol and mixtures thereof.

36. The process of claim 33 wherein said nitrogenated hydrocarbon comprises ammonium salts of organic acids and mixtures thereof.

37. A process for reducing the concentration of nitrogen oxides in an effluent which is at a temperature of below about 1450° F. while minimizing the production of other pollutants, the process comprising:

a. introducing a treatment agent which comprises a hydrocarbon into the effluent under conditions effective to reduce the concentration of nitrogen oxides in the effluent through a reaction or series of reactions facilitated by said hydrocarbon treatment agent; and b. varying at least one of the following parameters
   (i) dilution and introduction rate of said hydrocarbon treatment agent;
   (ii) components of said hydrocarbon treatment agent;
   (iii) relative presence of components of said hydrocarbon treatment agent; and
   (iv) position at which introduction of said hydrocarbon treatment agent occurs, wherein said reaction or series of reactions are driven towards a reduction of the production of other pollutants while substantially maintaining the level of nitrogen oxides reduction.

38. A process for reducing the concentration of nitrogen oxides in an effluent which is at a temperature below about 1450° F. while minimizing the production of other pollutants, the process comprising:

a. effecting a treatment regimen which comprises introducing a treatment agent comprising a hydrocarbon into the effluent under conditions effective to reduce the nitrogen oxides concentration in the effluent while minimizing the production of other pollutants at the boiler load currently in operation;

b. monitoring the boiler load until a significant change in boiler load is observed;

c. adjusting said treatment regimen by varying at least one of the following parameters
   (i) dilution and introduction rate of said hydrocarbon treatment agent;
   (ii) components of said hydrocarbon treatment agent; and
   (iii) relative presence of components of said hydrocarbon treatment agent, to effect an adjusted treatment regimen, wherein said adjusted treatment regimen operates under conditions effective to reduce the nitrogen oxides concentration in the effluent while minimizing the production of other pollutants.

39. The process of claim 38 wherein said treatment regimen is adjusted by reference to a load-dependent boiler characterization factor.

40. A process for reducing the concentration of nitrogen oxides in an effluent which is at a temperature below about 1450° F while minimizing the production of ammonia, the process comprising:

a. determining the effluent conditions at a location for introduction of a treatment agent;

b. introducing a treatment agent which comprises a hydrocarbon having a known nitrogen oxides reduction versus effluent temperature curve with a recognizable plateau into an effluent from the combustion of a carbonaceous fuel, which hydrocarbon treatment agent is effective to reduce the nitrogen oxides concentration of the effluent at the determined effluent conditions through a reaction or series of reactions facilitated by said hydrocarbon treatment agent and wherein said hydrocarbon treatment agent is introduced under conditions such that the injection acts within the nitrogen oxides reduction versus effluent temperature curve at a position on the curve to the right of the curve plateau;

c. adjusting the components, dilution/introduction rate or relative presence of components of said hydrocarbon treatment agent to shift said curve and thereby cause the introduction of said hydrocarbon treatment agent to operate towards the curve plateau of the shifted nitrogen oxides reduction versus effluent temperature curve.

41. The process of claim 40 wherein step b is repeated until the injection acts on the curve plateau of the shifted nitrogen oxides reduction versus effluent temperature curve.

* * * * *